United States Patent [19]
Osaragi et al.

[11] Patent Number: 5,983,511
[45] Date of Patent: Nov. 16, 1999

[54] APPARATUS FOR DISPLAYING AN APPROPRIATE HEIGHT

[75] Inventors: Kazuki Osaragi; Satoshi Hirano, both of Tokyo, Japan

[73] Assignee: Kabushiki Kaisha Topcon, Tokyo, Japan

[21] Appl. No.: 08/812,422

[22] Filed: Mar. 6, 1997

[30] Foreign Application Priority Data

Mar. 6, 1996 [JP] Japan .................................. 8-048756

[51] Int. Cl.⁶ .............................. G01C 15/06; G01C 5/00
[52] U.S. Cl. ................................ 33/293; 33/290; 33/291; 33/294
[58] Field of Search .............................. 33/263, 290, 291, 33/293, 294, DIG. 21

[56] References Cited

U.S. PATENT DOCUMENTS

| | | | |
|---|---|---|---|
| 4,029,415 | 6/1977 | Johnson | 33/294 |
| 4,653,910 | 3/1987 | Poling | 33/294 |
| 4,820,041 | 4/1989 | Davidson et al. | 33/293 |
| 5,313,409 | 5/1994 | Wiklund et al. | 33/291 |
| 5,402,223 | 3/1995 | Schlobohm et al. | 33/293 |
| 5,457,890 | 10/1995 | Mooty | 33/294 |
| 5,537,200 | 7/1996 | Kumagai et al. | 33/293 |
| 5,742,387 | 4/1998 | Ammann | 33/290 |

OTHER PUBLICATIONS

Brochure—TOPCON "New LS–B2 Level Sensor For Machine Control".
Brochure—TOPCON "LS–B2 Machine Mounted Laser Sensor".

*Primary Examiner*—Christopher W. Fulton
*Assistant Examiner*—Quyen Doan
*Attorney, Agent, or Firm*—Foley & Lardner

[57] ABSTRACT

An apparatus for displaying a direction for adjusting its height to its appropriate height includes a plurality of light sources, a light receiving portion, and a control unit. The light sources are arranged in the form of a matrix in a display portion of the apparatus and displays the direction as a moving shape by emitting light in turn. The light receiving portion receives an incident beam and outputs a signal corresponding to a height of the incident beam. The control unit controls the light emission of the light sources in accordance with the signal so as to move the shape downward or upward to indicate the appropriate height. The control unit controls the light emission of the light sources so that at least one light source of a group of the light sources is lighted after a predetermined time, shorter than a time during which a human eye can keep an afterimage, after other members of the group were lighted.

14 Claims, 6 Drawing Sheets

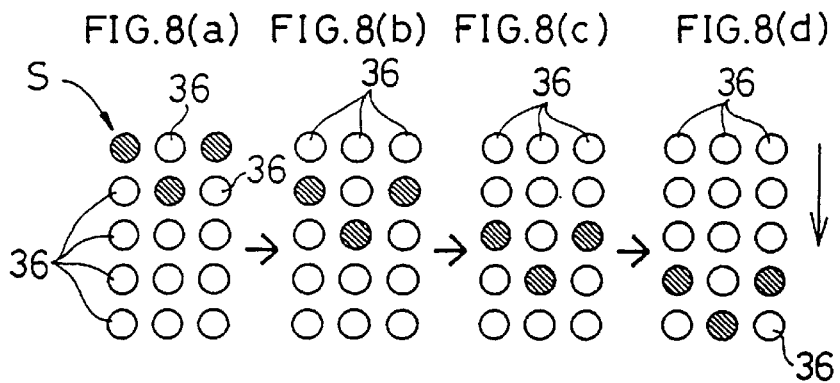
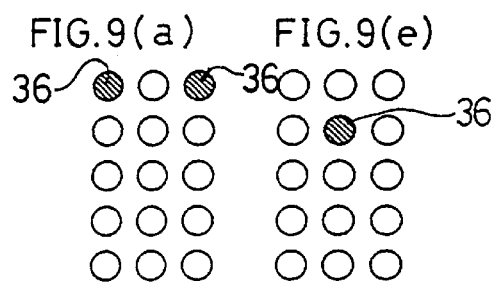
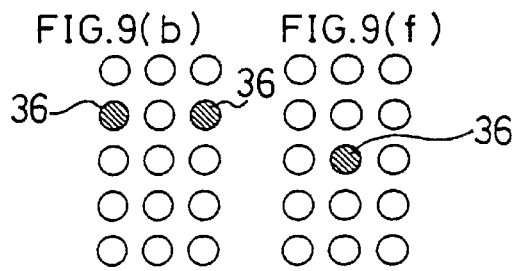
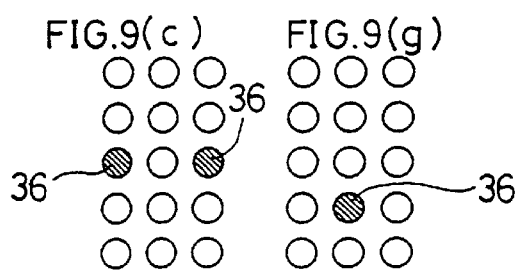
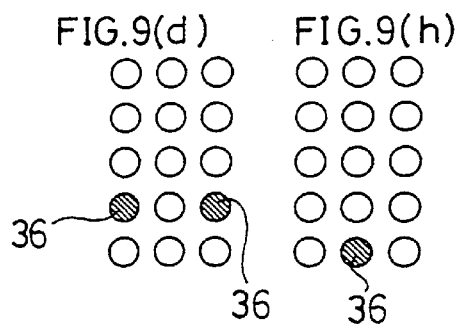

APPARATUS FOR DISPLAYING AN APPROPRIATE HEIGHT

BACKGROUND OF THE INVENTION

1. Field of the Invention

This invention relates to an apparatus for indicating a direction for adjusting the height of the apparatus to an appropriate height (hereinafter the direction is referred to as "the direction of an appropriate height) so as to enable an operator to recognize it visually and dynamically.

2. Description of the Prior Art

In construction of the land readjustment of housing sites or agricultural fields, it is performed to level the ground. For the construction, large-sized construction machines, such as a bulldozer and a crawler, are used, and the ground is dug and moved by means of the blades of the machines so as to achieve a finished surface which conforms to a site plan. In this ground-leveling operation, surveys are made before and during the operation. Places, on which the ground should be banked or from which the ground should be removed, are determined by the survey made before the operation, and the ground-leveling operation is repeatedly performed in accordance with measured values obtained by the survey, which is carried out as occasion demands, during the operation. As a result, the ground is leveled to conform to the site plan.

An example of such a surveying operation is as follows.

First, a surveyor vertically sets a pole at a place to be surveyed. After that, another skilled surveyor collimates the pole with an optical level and reads numerical values indicating the height at the level. This operation is repeatedly performed, and thereby a plurality of places to be surveyed are measured to calculate differences in elevation among the places.

In recent years, however, a surveying operation in which a rotational laser apparatus cooperates with an appropriate-height displaying apparatus has been employed from the viewpoint of the speedup of construction, the reduction of man-hours, and the reduction of labor costs.

The rotational laser apparatus emits a laser beam in a horizontal direction while rotating so as to form a reference plane of the laser beam. The appropriate-height displaying apparatus receives the emitted laser beam, and then displays the direction of a deviation of an appropriate height from the height of the reference plane of the laser beam.

An example of the aforementioned case is shown in FIG. 1. Reference numeral 1 denotes a rotational laser apparatus, and 2 denotes an appropriate-height displaying apparatus. The rotational laser apparatus 1 is fixed on a tripod 3 which is set at a predetermined place K. A reference plane is formed by a laser beam P projected from the rotational laser apparatus 1. The appropriate-height displaying apparatus 2 is fixed on, for example, an attachment pole 6 which is stood on a blade 5 of a bulldozer 4. Thereby, the height from the ground surface of the predetermined place K to the reference plane of the rotational laser apparatus 1 is correlated with the height from the appropriate-height displaying apparatus 2 to an edge 5a of the blade 5. Accordingly, if the construction is carried out such that the appropriate-height displaying apparatus 2 receives a projected laser beam at a position of a predetermined height, the ground leveling operation can be performed at a predetermined ground level.

As shown in FIGS. 2 and 3, the appropriate-height displaying apparatus 2 generally comprises a displaying apparatus body 7, a plurality of light sources 8 for display, a pair of light receiving portions 9, and a control portion disposed inside of the displaying apparatus body 7. In the light sources 8, each three of them makes a set, and sets in the upper, middle, and lower parts of the apparatus body 7 serve as display portions 8a, 8b, 8c, respectively. Electric power to the appropriate-height displaying apparatus 2 is supplied from a battery of the bulldozer 4. Reference numeral 10 denotes a connector for the power source.

In this conventional appropriate-height displaying apparatus 2, the three light sources 8 of the display portion 8a are simultaneously turned on when the appropriate height of the apparatus 2 is greater than its actual height at that moment. On the other hand, the three light sources 8 of the display portion 8c are simultaneously turned on when the appropriate height is lower than the actual height at that moment. The three light sources 8 of the display portion 8b are simultaneously turned on when the appropriate height is equal to the actual height at that moment.

By the conventional appropriate-height displaying apparatus, it is needed to recognize the position of a display portion which is in an ON-state in comparison with the position of display portions which are in an OFF-state in order to determine which of the display portions 8a, 8b, 8c is lighting. Therefore, by the conventional apparatus, disadvantageously, it is impossible to intuitively recognize information on the direction of the appropriate height in comparison with the actual height at that moment.

This disadvantage is not overcome by conspicuously flashing the display of the light sources 8. Nor is the disadvantage overcome by increasing the brightness of light emitted by the light sources 8. As a solution to this, it can be expected to display information on the direction of the appropriate height by the use of signs, such as arrows, or words, such as "up" and "down".

However, these display methods do not enable intuitive recognition of the information on the direction of the appropriate height in comparison with the actual height at that moment because, according to the display methods, the whole of figures or words must be visually recognized in order to judge the direction to adjust the height of the displaying apparatus to the appropriate height. In addition, if the display, which is in a static state and is inconspicuous, is attempted to be made conspicuous, power consumption is enlarged, and thereby another power source provided in a machine body or the like would be required.

SUMMARY OF THE INVENTION

In order to overcome the aforementioned disadvantage, an apparatus for displaying a direction for adjusting its height to its appropriate height according to an aspect of the present invention includes a plurality of light sources for displaying the direction as a moving shape, a light receiving portion for receiving an incident beam and outputting a signal corresponding to a height of the incident beam, and a control unit for controlling light emission of the light sources so as to move the shape downward or upward in a way of indicating the appropriate height in accordance with the signal in order to enable a person to recognize visually and dynamically the direction of the appropriate height in comparison with the actual height at that moment, and the control unit controls the light emission of the light sources so that at least one light source of a group of the light sources is lighted after a predetermined time, shorter than a time during which a human eye can keep an afterimage, after other members of the group were lighted.

According to a second aspect of the present invention, an apparatus for displaying a direction for adjusting its height to its appropriate height includes a plurality of light sources for displaying the direction as a moving shape, a light receiving portion for receiving an incident beam and outputting a signal corresponding to a height of the incident beam, and a control unit for controlling light emission of the light sources so as to move the shape downward or upward in a way of indicating the appropriate height in accordance with the signal in order to enable a person to recognize visually and dynamically the direction of the appropriate height in comparison with the actual height at that moment, and the control unit controls the light emission of the light sources so as to move the shape at a velocity variable in proportion to a deviation of an actual height of the apparatus at that moment from the appropriate height. Thereby, the apparatus enables an operator to judge the direction of the appropriate height dynamically and intuitively.

BRIEF DESCRIPTION OF THE DRAWINGS

FIGS. 8(a) to 8(d) are explanatory drawings of an example of light emissions of the light sources according to the present invention, showing a situation where an inverse triangular mark moves downward by the light emissions of the light sources for display.

FIGS. 9(a) to 9(d) are explanatory drawings of an example of light emissions of the light sources used for display according to the present invention, showing a situation where the base of an inverse triangular mark moves downward by simultaneous light emissions of two light sources used for display.

FIGS. 9(e) to 9(h) are explanatory drawings of an example of light emissions of the light sources used for display according to the present invention, likewise showing a situation where the vertex of an inverse triangular mark moves downward and explaining that an inverse triangular mark is formed by an afterimage phenomenon.

DESCRIPTION OF THE PREFERRED EMBODIMENTS

Figure 1:
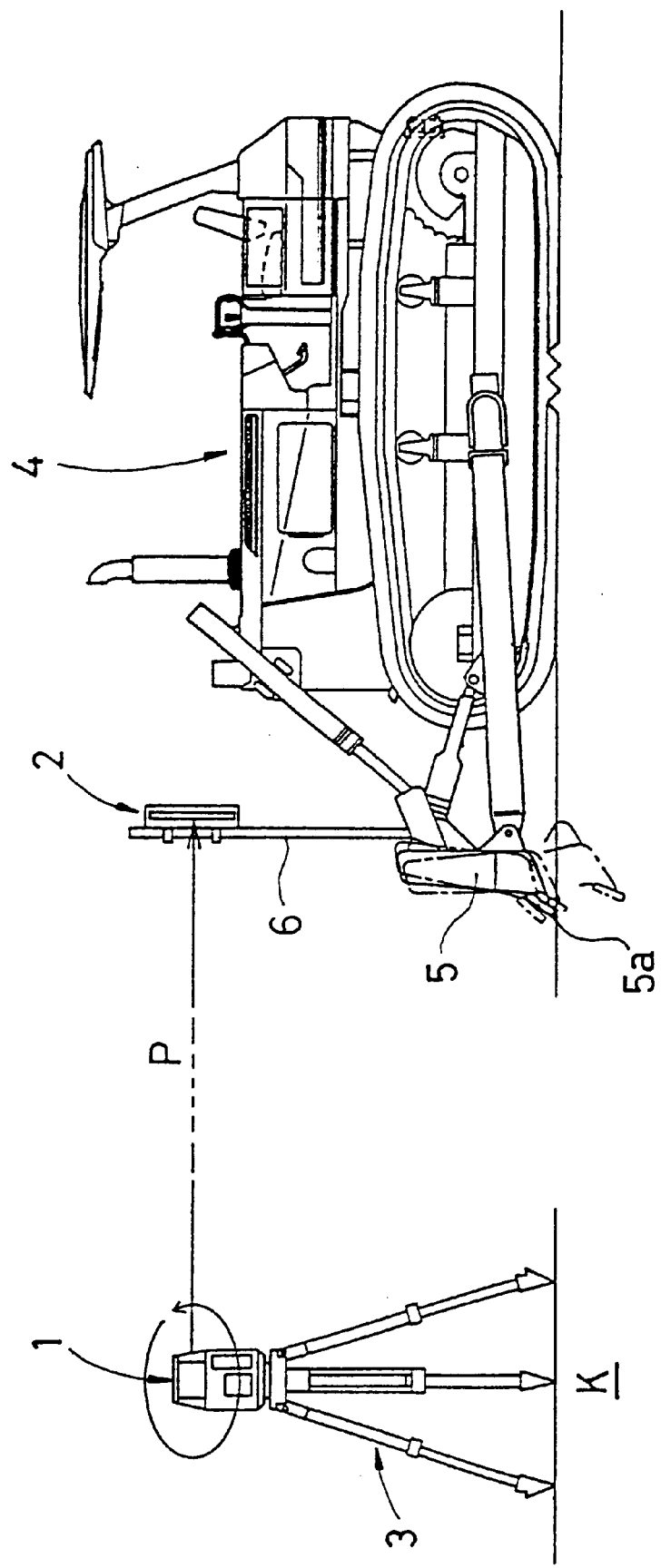
FIG. 1 is a schematic view showing how to use an apparatus for displaying an appropriate height.
Figure 2:
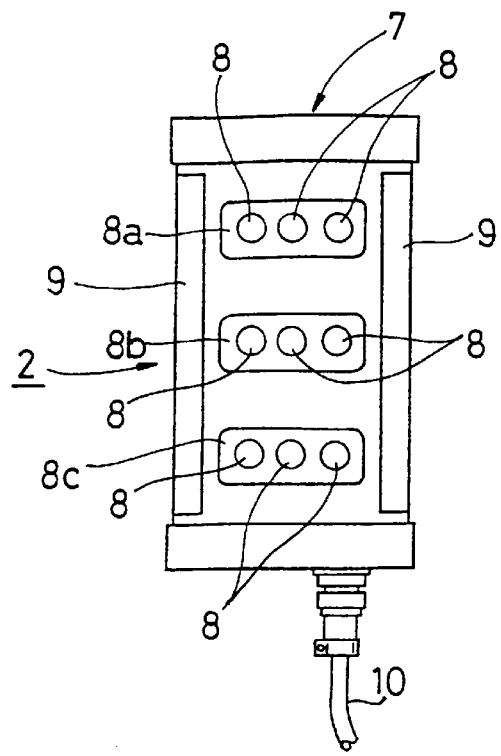
FIG. 2 is a front view showing a construction of a conventional apparatus for displaying an appropriate height.
Figure 3:
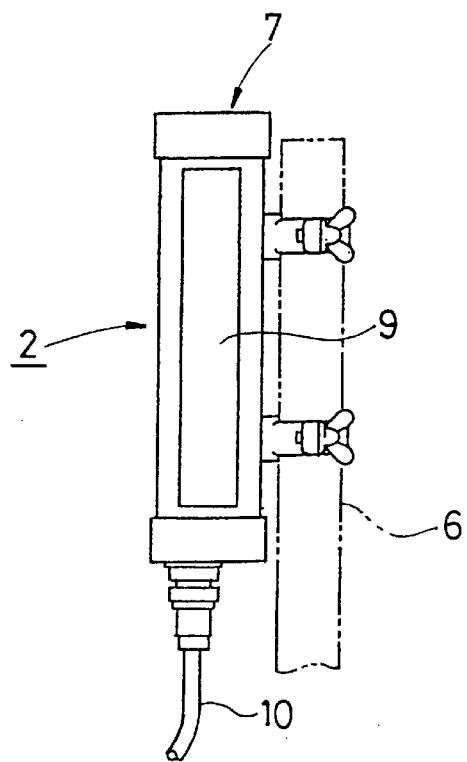
FIG. 3 is a side view showing the apparatus of FIG. 2.
Figure 4:
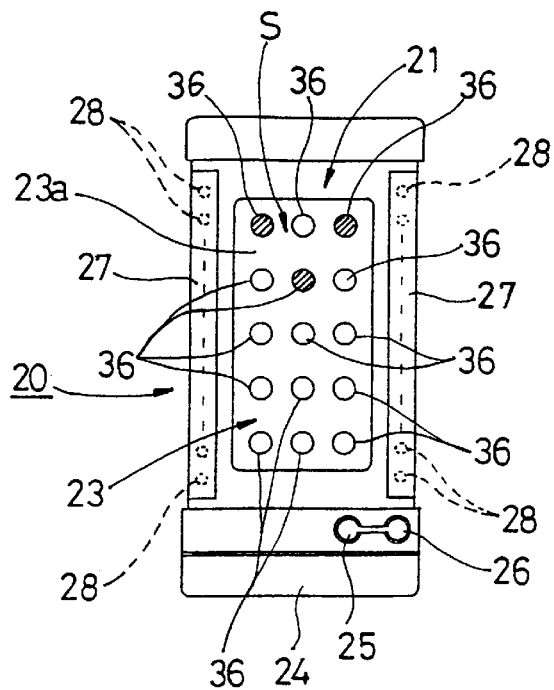
FIG. 4 is a front view showing an apparatus for displaying an appropriate height according to the present invention.
Figure 5:
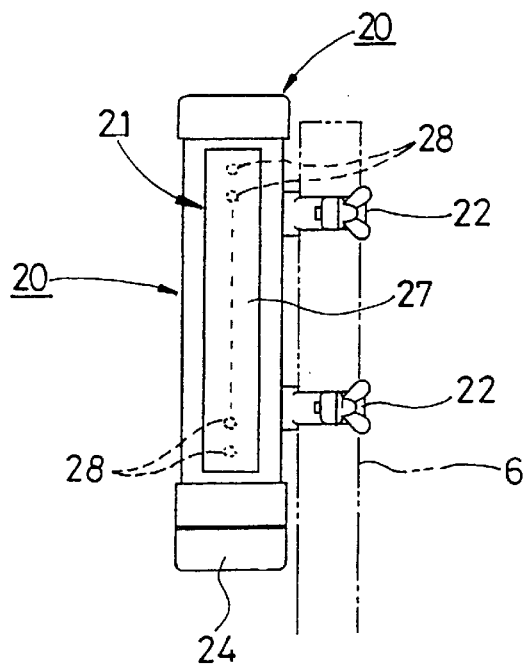
FIG. 5 is a side view showing the apparatus of FIG. 4.

FIGS. 4 and 5 show an apparatus 20 for displaying a direction of an appropriate height according to the present invention. In the apparatus 20, an apparatus body 21 is fixed to an attachment pole 6 by means of pole clamps 22 in the same way as a conventional apparatus. The apparatus body 21 has a display portion 23 which is disposed on a surface of the apparatus body 21 which faces to an operator's seat of a bulldozer 5. A storage battery containing a storage battery containing portion 24 is disposed in the lower part of the apparatus body 21. For example, a Ni—Cd storage battery, a Ni—H storage battery, or the like, is contained in the storage battery containing portion 24. The apparatus 20 is driven by the storage battery.

A data output connector portion 25 and an external power source connector portion 26 are disposed near the storage battery containing portion 24. As occasion demands, the external power source connector portion 26 is connected to a battery of the bulldozer 5 or to an external power source by means of an electric cord (not shown). The data output connector portion 25 is, according to the need, used for another display on another displaying apparatus. A pair of light receiving portions 27 are disposed on both sides of the display portion 23.

Figure 6:
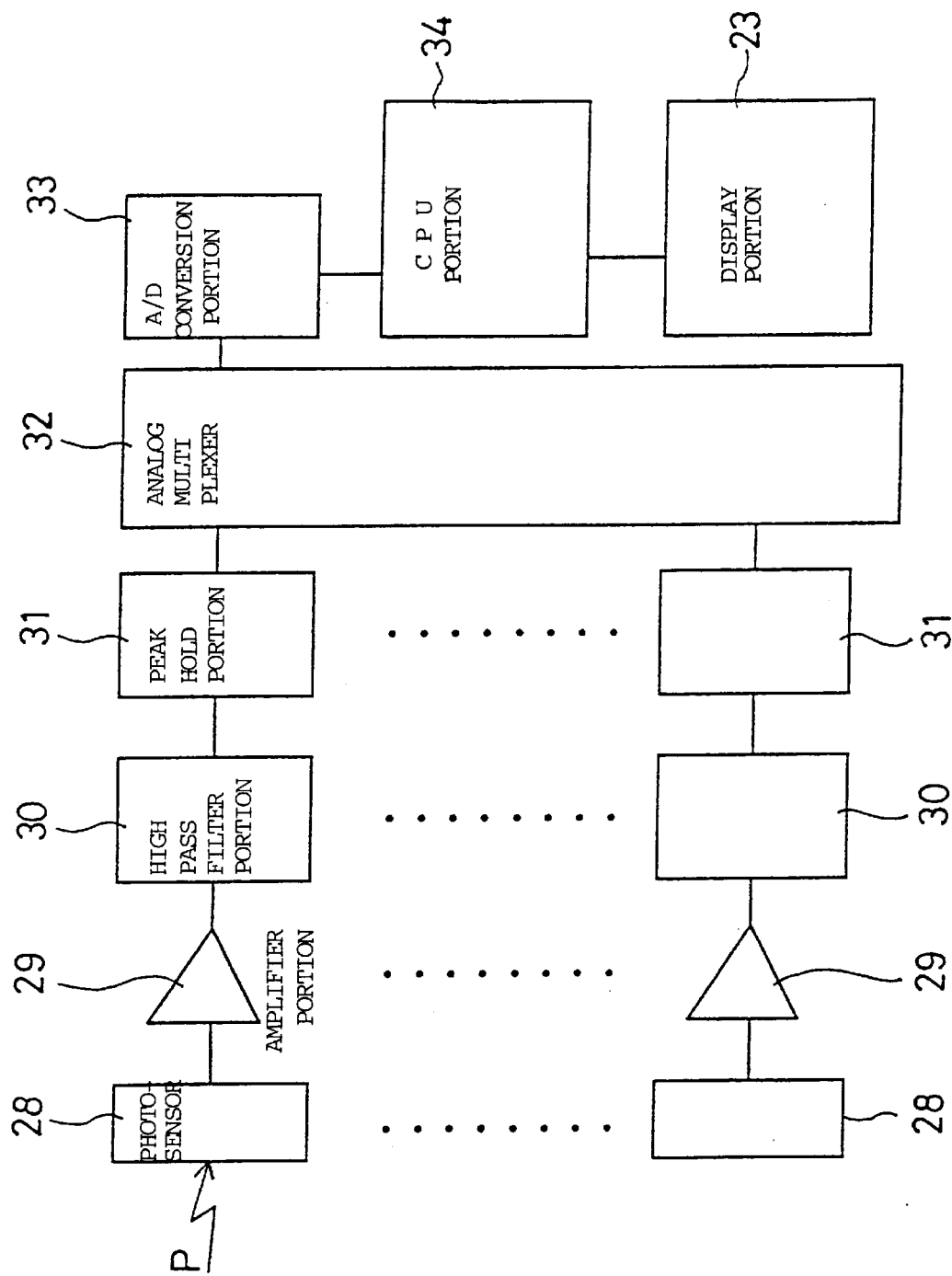
FIG. 6 is a block diagram showing the circuitry of the apparatus for displaying an appropriate height according to the present invention.

In the pair of light receiving portions 27, as shown in FIGS. 4 and 5, a plurality of photosensors 28 which are arranged longitudinally into a line are disposed at a predetermined interval. As shown in FIG. 6, an output signal of each of the photosensors 28, which is generated by receiving the laser beam emitted from the apparatus 1, is amplified by each of amplifiers 29, and is then input into each of high pass filter portions 30. The laser beam projected from the apparatus 1 is modulated. The signals output from the photosensors 28 contain signals generated by extraneous noise light. The signals generated by the extraneous noise light are cut off by the high pass filter portion 30. The signal which has passed through the high pass filter portion 30 is input to a peak hold portion 31. The peak hold portion 31 holds the peak value of the input signal. The output terminals of the peak hold portions 31 are connected to the input terminals of an analog multiplexer 32. The analog multiplexer 32 samples the output signals of the peak hold portions 31 that corresponds to the photosensors 28, respectively. At that time, the analog multiplexer 32 selects the input signals from each of the peak hold portions 31, which correspond to the output signals from each of the photosensors 28, to output to an A/D conversion portion 33 in conformity with selection signals output from a CPU 34. The analogue signals output from the multiplexer 32 are converted into digital signals by the A/D conversion portion 33 to be input to the CPU 34 used as a control unit. These circuit portions are disposed inside of the apparatus body 21.

Figure 7:
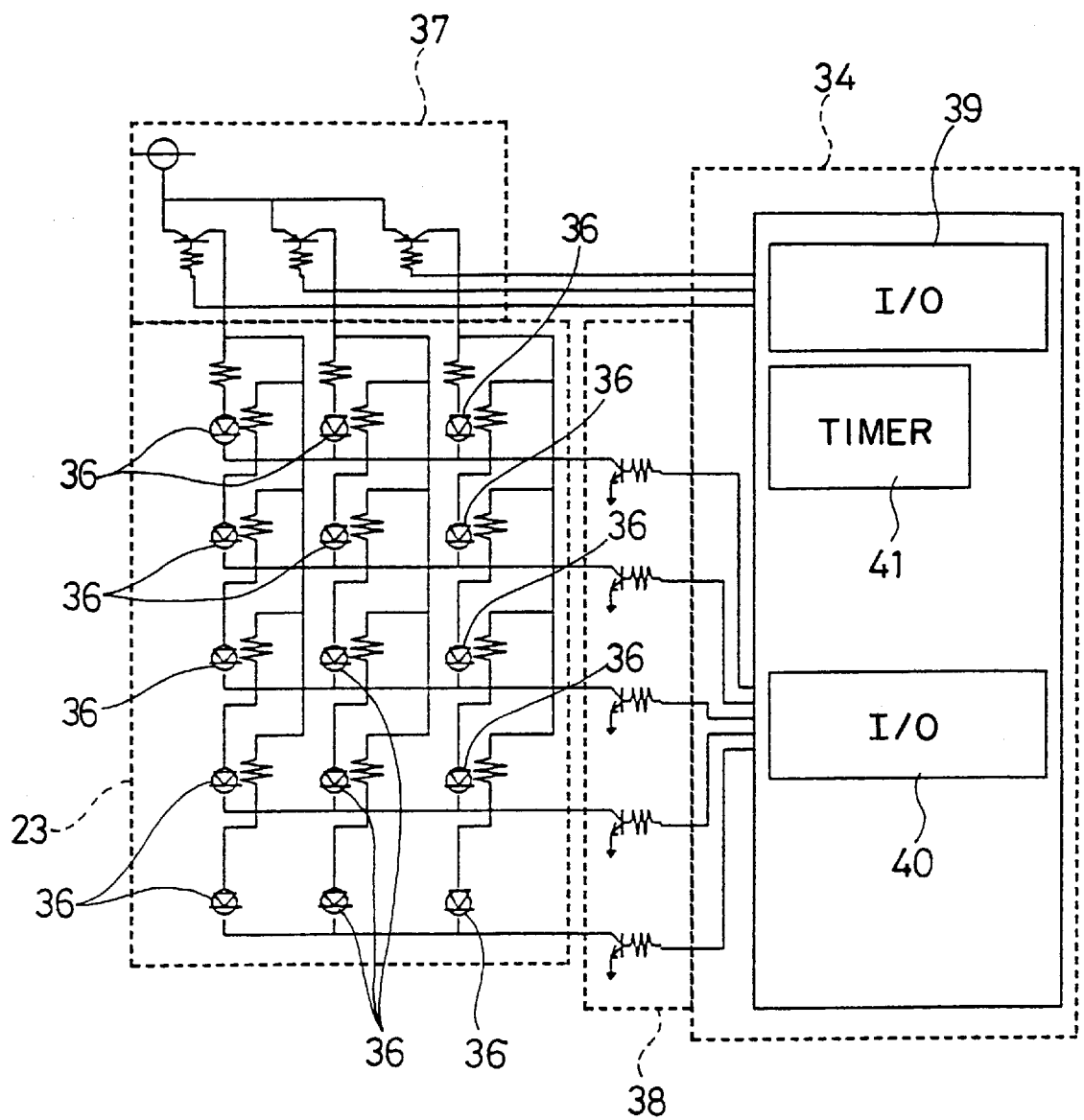
FIG. 7 is a circuit diagram showing a circuit for controlling light emissions of light sources for display of the apparatus according to the present invention.

In the display portion 23, as shown in FIGS. 4 and 7, light sources 36 for display are disposed, for example, in the form of a matrix composed of three rows and five columns which are distributed at even intervals, respectively.

A light emitting diode is used as the light source 36. Instead, a liquid crystal may be used as the light source 36. The light source 36 is covered with a transparent dark cover 23a. The light source 36 can be seen and recognized from the outside only when light is emitted from the light source 36.

As shown in FIG. 7, the light emissions of the light sources 36 are controlled by a row drive circuit 37 and a column drive circuit 38. The row drive circuit 37 is controlled by a CPU 34 through a parallel input-and-output interface portion 39. The column drive circuit 38 is controlled by the CPU 34 through a parallel input-and-output interface portion 40. Reference numeral 41 denotes a timer for regulating a display time.

The CPU portion 34 controls light emissions of the light sources 36 so as to display a shape like a triangle S, which is composed of three lighted light sources 36, and so as to move the shape S in the direction of the appropriate height (see FIGS. 8(a)–8(d)) on the basis of the output signal of a photosensor 28 that has received the laser beam projected from the apparatus 1.

When the photosensor 28 that has received the laser beam is located at a position lower than the center position of the whole length of the longitudinally disposed photosensors 28, that fact means that the appropriate height of the apparatus 20 is lower than its actual height at that time. In this case, the shape S displayed by the light sources 36 is repeatedly moved downward, as shown in FIGS. 8(a) to 8(d).

When the photosensor 28 that has received the laser beam is located at a position higher than the center position, that fact means that the appropriate height of the apparatus 20 is higher than its actual height at that time. In this case, the shape S is repeatedly moved upward.

In other words, by controlling the light emissions of the light sources 36, the shape S can be displayed as if it moves downward or upward so as to enable an operator to perceive it intuitively. Thereby, the direction of the appropriate height can be perceived without judging the information itself in the form of letters or figures.

In this embodiment, the triangular shape S is formed by the light emitted from three of the light sources 36, as mentioned above. In FIGS. 8(a) to 8(d), oblique lines drawn inside some of the light sources 36 indicate that they are lighting.

The lighting method of the three light sources 36 is as follows.

That is, at first, two of the three obliquely-lined light sources 36 are, as shown in FIGS. 9(a) to 9(d), lighted simultaneously. Next, the remaining one of the three light sources is, as shown in FIGS. 9(e) to 9(h), lighted after ten milliseconds after the simultaneous lighting of two display light sources 36. The interval from the time when the two of the three light sources which have been first lighted to the time when the one of the three which is lastly lighted is shorter than a period of time for which afterimages of the two are held. Therefore, the shape S is formed by the three light sources which are lighted with a time lag between the first two and the last one within a time of holding afterimages of the first two. Thus, the light emissions of the light sources 36 are controlled by using the afterimage phenomenon of human eyes, and thereby the saving of the power for displaying the shape S can be realized.

The CPU 34 moves the shape S rapidly, at such a speed that the time necessary for the shape S to move from the top of the display portion 23 to its bottom is about 100 milliseconds when a deviation of the actual height of the apparatus 20 at that time from its appropriate height is large. The CPU 34 moves the shape S slowly, at such a speed that the necessary time is about 400 milliseconds when a deviation of the actual height of the apparatus 20 at that time from its appropriate height is small. Thereby, the length of the deviation of the actual height of the apparatus 20 at that time from its appropriate height can be recognized intuitively and dynamically.

The interval from the time when two light sources 36 shown in FIG. 9(a) are lighted simultaneously to the time when two light sources 36 shown in FIG. 9(b) are lighted simultaneously is, for example, 100 milliseconds. In this case, the information about the appropriate-height direction looks to be moving fast. When the interval is, for example, 400 milliseconds, the information looks to be moving slowly. These features are also found in the lighting-time interval from FIG. 9(b) to FIG. 9(c) and in the lighting-time interval from FIG. 9(c) to FIG. 9(d). Since the light sources 36 shown in FIGS. 9(e) to 9(h) use the afterimage phenomenon, each of them is lighted after 10 milliseconds after the two light sources 36 shown in FIGS. 9(a) to 9(d) have been lighted, as mentioned above. The timer 41 is used for regulating the interval of lighting time of these light sources 36 in conformity with the method mentioned above.

According to the thus constructed apparatus for displaying the appropriate height, a direction of the appropriate height can be recognized dynamically and intuitively.

We claim:

1. An apparatus for displaying a direction for adjusting a height of the apparatus to an appropriate height, comprising:
   a plurality of light sources, arranged in a matrix in a display portion, the light sources indicating the direction of the height of the apparatus in relation to the appropriate height as a moving shape;
   a light receiving portion for receiving an incident beam which acts as a reference for the appropriate height and outputting a signal corresponding to a height of said incident beam; and
   a control unit for controlling light emission of said plurality of light sources in accordance with the signal to move the shape downward or upward corresponding to the appropriate height, said control unit controlling light emission of said plurality of light sources by emitting light from a first group of said plurality of light sources during a first predetermined time and then emitting light from at least one light source of a second group of said plurality of light sources a second predetermined time after said first predetermined time, said second predetermined time is shorter than a time during which a human eye can retain an afterimage, such that the shape on the display portion moves before the apparatus reaches the appropriate height.

2. The apparatus of claim 1, wherein the apparatus is coupled to construction equipment.

3. An apparatus for displaying a direction for adjusting a height of the apparatus to an appropriate height, comprising:
   a plurality of light sources, arranged in a matrix in a display portion, the light sources indicating the direction of the height of the apparatus in relation to the appropriate height as a moving shape;
   a light receiving portion for receiving an incident beam which acts as a reference for the appropriate height and outputting a signal corresponding to a height of said incident beam; and
   a control unit for controlling light emission of said plurality of light sources in accordance with the signal to move the shape downward or upward corresponding to the appropriate height, said control unit controlling said light emission so as to move the shape at a velocity variable in proportion to a deviation of an actual height of said apparatus at that moment from the appropriate height.

4. The apparatus of claim 3, wherein the apparatus is coupled to construction equipment.

5. An apparatus for indicating a height adjustment, comprising:
   a photosensor for receiving a light beam and outputting a first signal corresponding to a height of said light beam;
   a plurality of display lights, arranged in a matrix and disposed on a display portion of the apparatus, said plurality of display lights capable of displaying a shape; and
   a control unit for controlling light emission of said plurality of display lights in accordance with said first signal, such that said shape moves in a direction corresponding to an appropriate height before the apparatus reaches the appropriate height.

6. The apparatus of claim 5, wherein said control unit moves said shape downward or upward.

7. The apparatus of claim 6, wherein said control unit controls light emission by emitting light from a first group of said plurality of display lights at a first predetermined time and then by emitting light from at least one display light of a second group of said plurality of display lights at a second predetermined time after said first group is lighted, said second predetermined time is shorter than a time during which a human eye can keep an afterimage.

8. The apparatus of claim 7, further comprising:
a power source coupled to said display portion, wherein said control unit controls emission of said first and second groups of said plurality of display lights in a manner to conserve power from said power source.

9. The apparatus of claim 7, wherein said shape moves along said display portion at a velocity proportional to a magnitude of a displacement of said height of said apparatus in relation to said appropriate height.

10. The apparatus of claim 7, further comprising:
a timer coupled to said control unit to regulate an interval of a lighting timing of said plurality of display lights.

11. The apparatus of claim 5, wherein said light beam is modulated, and further comprising:

a high pass filter coupled to said photosensor to block extraneous noise from said first signal; and a peak hold circuit to hold a peak value of a filtered first signal.

12. The apparatus of claim 11, further comprising:

a plurality of photosensors, each of said photosensors disposed on the apparatus at a different height and generating a receiving signal; and a multiplexer coupled to said control unit to determine from which of said plurality of photosensors said receiving signal originated.

13. The apparatus of claim 5, wherein said display lights are selected from the group consisting of light emitting diodes and liquid crystals.

14. The apparatus of claim 5, wherein the apparatus is coupled to construction equipment.

* * * * *